United States Patent [19]

Koumi et al.

[11] Patent Number: 4,460,012
[45] Date of Patent: Jul. 17, 1984

[54] CARTRIDGE-TYPE VALVE

[75] Inventors: Noboru Koumi; Takeshi Nishitani, both of Yokohama; Kazuo Okayasu; Yoshikazu Takamizawa, both of Tokyo, all of Japan

[73] Assignees: JGC Corporation; OKA Valve Mfg. Co., Ltd., both of Tokyo, Japan

[21] Appl. No.: 236,270

[22] Filed: Feb. 20, 1981

[30] Foreign Application Priority Data

Feb. 22, 1980 [JP]  Japan .................................. 55-21208
Jul. 16, 1980 [JP]  Japan .................................. 55-97023

[51] Int. Cl.³ ............................................. F16K 25/00
[52] U.S. Cl. .................................. 137/454.6; 137/315; 251/315
[58] Field of Search .................. 137/454.2, 454.6, 315; 251/315

[56] References Cited

U.S. PATENT DOCUMENTS

| 1,898,935 | 2/1933 | Brandriff | 137/454.2 X |
| 2,936,778 | 5/1960 | Stillwagon | 137/454.6 |
| 3,117,587 | 1/1964 | Willinger | 137/315 |
| 3,150,681 | 9/1964 | Hansen | 137/454.2 |
| 3,250,291 | 5/1966 | Roy | 137/454.6 |
| 3,717,323 | 2/1973 | Geipel | 251/315 |
| 4,316,480 | 2/1982 | Kah | 251/367 X |

Primary Examiner—Harold W. Weakley
Attorney, Agent, or Firm—Armstrong, Nikaido, Marmelstein & Kubovcik

[57] ABSTRACT

A valve for controlling the flow of fluids, improved by utilizing a cartridge, containing a valve head and a valve seat, which is placed in a box-type valve body. The cartridge enables rapid exchange of the valve head and valve seat.

Thus, the improved valve is particularly suitable for use in pipe lines of nuclear power plants, in which radioactive substances flow.

1 Claim, 13 Drawing Figures

CARTRIDGE-TYPE VALVE

BACKGROUND OF THE INVENTION

1. Field of the Invention

The present invention relates to an improved valve, more particularly, to a valve having a cartridge which enables exchange of the valve head and valve seat in a very short time without detaching the body of the valve from the line pipe in which the valve is incorporated.

2. State of the Art

In general, it is desirable that valve used in the piping system of various plants can be serviced as quickly as possible at the time of periodical maintenance or repair when troubled. Also, it is preferable that servicing can be done without removing the valve body from the piping. The above needs are more acute in cases where a valve is installed in a piping through which radioactive or toxic substances flow, and moreover, care is required to prevent scattering of the liquid containing the radioactive or toxic substances. Even if sufficient preventive measures are taken, it is of course preferable that the hazardous substances be treated without direct handling thereof.

With respect to ball valves, the so-called "Gachault-Valve" which is separable into three parts has been devised and is in use (see Japanese Patent Publication No. 28836/1969 "Ball Valve"). This type of valve is of a construction whereby the valve body at the center can be demounted by loosening the bolts and nuts connecting the flanges on both sides of the body, and therefore, enables the saving of time and labor during servicing. However, disassembling of the valve has some influence on the piping system, and spilling of the liquid contained in the valve is unavoidable.

As another form of improvement, there is a ball valve called the "Top-Entry" type. This valve can be assembled and disassembled by approaching from the top of the valve. The ball piece of the valve can be mounted or demounted by removing the bonnet on the top of the valve body and loosening the seat-fastener. So, it can be handled without removing the valve body from the pipe line, and no spilling of liquid occurs. Further, visual inspection of the inner parts of the valve is relatively easy. However, loosening of the seat-fastener is unexpectedly troublesome and takes time. Due to the construction thereof, liquid and sludge are apt to accumulate in the valve, posing a large possibility of contamination upon contact during servicing.

SUMMARY OF THE INVENTION

The general object of the present invention is to provide a valve with which the time necessary for its maintenance can be greatly shortened.

The specific object of the invention is to provide a valve which is particularly suitable for use in controlled areas of high-level radioactivity in nuclear power plants.

The above objects can be achieved with the present invention in which the valve head and valve seat are contained in a cartridge which is attachable to and detachable from a box-type valve body. Further, these objects can be achieved more satisfactory, in accordance with the preferable embodiment of the invention, by utilizing a bayonet-type mounting system for the attaching and detaching of the cartridge to and from the bonnet of the valve.

DRAWINGS

FIGS. 1 through 5 show a basic embodiment of the present invention as applied to a ball valve.

FIGS. 7 through 11 show a preferred embodiment of the present invention also applied to a ball valve.

FIGS. 12A and 12B explain the effects of the preferred embodiment.

In these Figures, the parts indicated with denser hatching constitute the cartridge.

DETAILED DESCRIPTION OF PREFERRED EMBODIMENTS

In the basic embodiments, the cartridge-type valve of the present invention is, in a valve comprising a valve body, a valve head and a valve seat, and a bonnet and a bonnet stem, characterized in that the valve body is of a box-type, that the valve head and the valve seat are contained in a cylindrical cartridge with a closed bottom and having passageways for flowing fluid, and that the cartridge is attachable to and detachable from the box-type valve body.

The following will describe a ball valve, a typical valve to which the present invention is applicable, with reference to the attached drawings.

Figure 1:
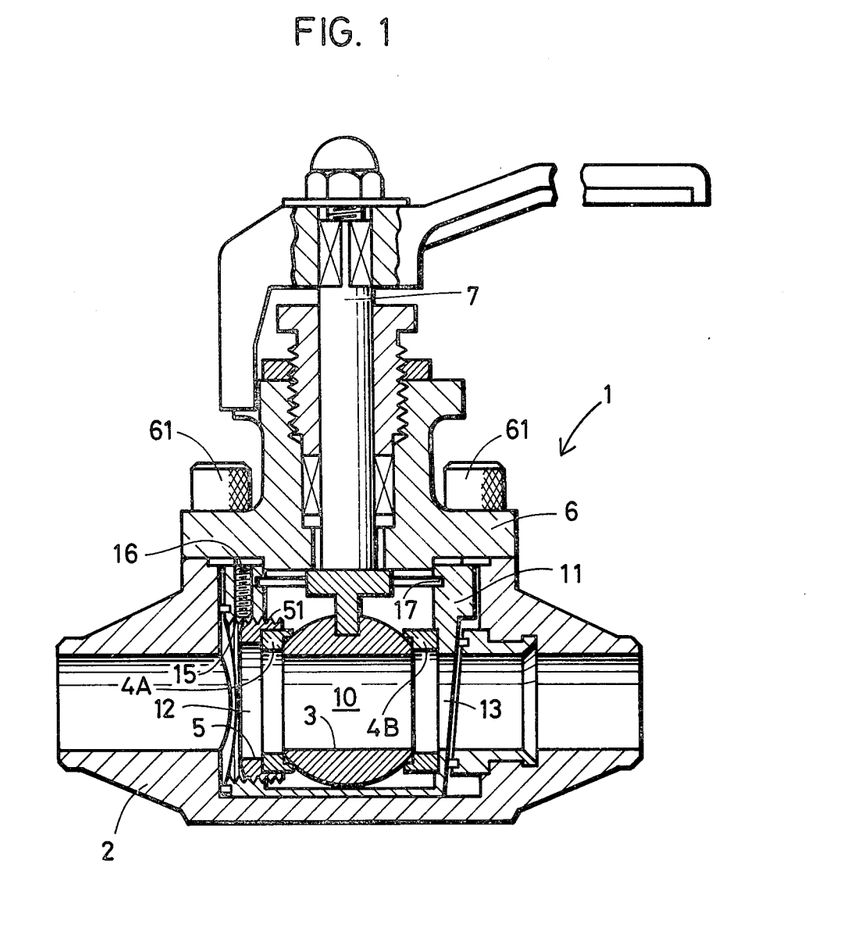
FIG. 1 is a sectional view in the plane along the line of fluid flow and including the bonnet stem.
Figure 2:
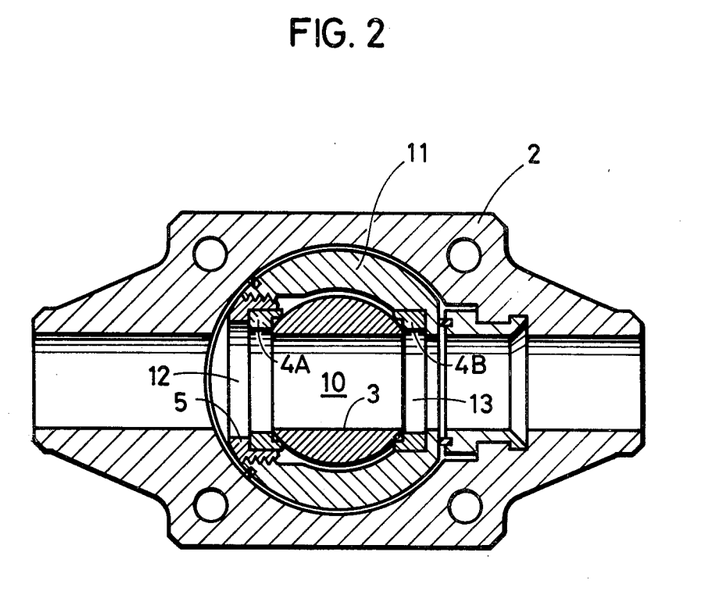
FIG. 2 is another sectional view in the plane along the line of fluid flow but transversing the bonnet stem.

As shown in FIG. 1 and FIG. 2, valve body 2 is of a box-type with space for receiving cartridge 10. Case 11 of the cartridge 10 which is attachable to and detachable from the space in the body has the shape of a cylinder with closed bottom and has passageways 12 and 13 for flowing fluid. In the case 11, ball, that is valve head 3 is held by a combination of valve seats 4A and 4B which are in opposite positions. The valve seats 4A and 4B are made of a suitable material, such as Teflon, selected in view of the use of the valve. One of the seats, 4B, is fixed to the case 11, and the other seat 4A may be moved by adjuster 5 so as to give suitable contact with the ball 3. The adjuster 5 is moved by turning it so as to adjust the engagement between external thread 51 on the outer surface of the adjuster and internal thread 15 on the inner surface of the passageway 12, and is set at a suitable position by fixing bolt 16.

Figure 3:
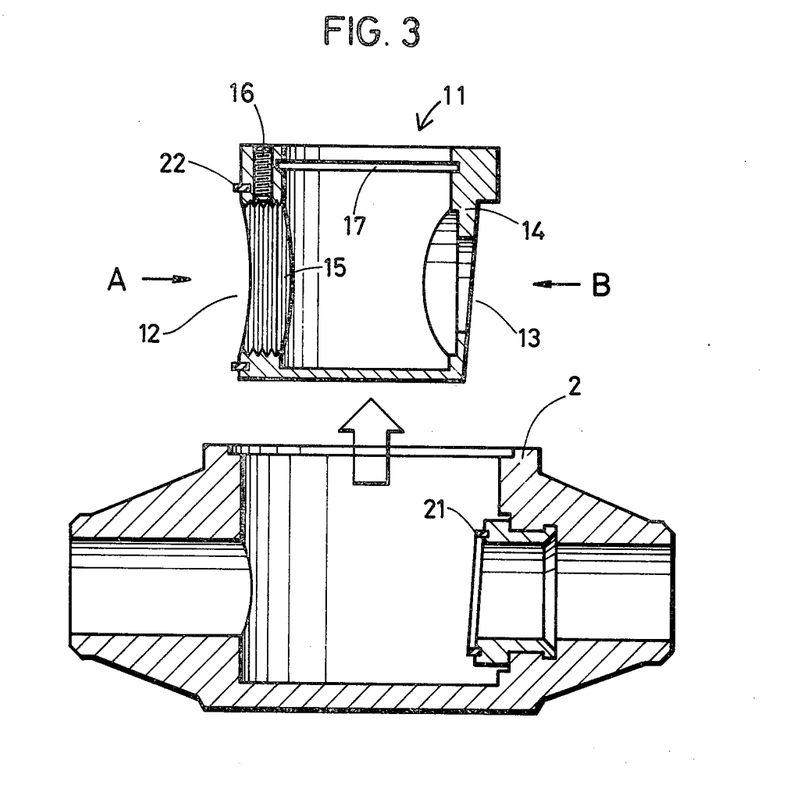
FIG. 3 show the valve body and the cartridge, the latter without inner parts, to show the cartridge case.
Figure 4:
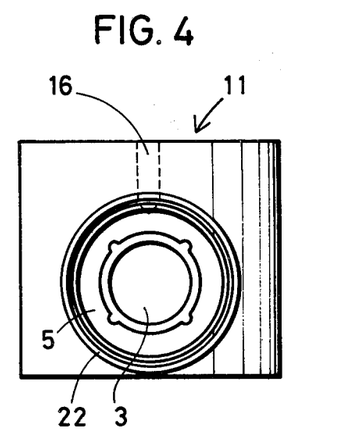
FIG. 4 is a side view of the cartridge in the direction of arrow "A" in FIG. 3.
Figure 5:
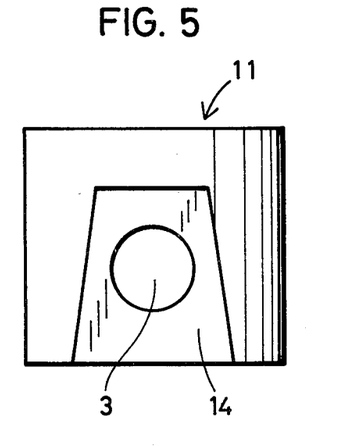
FIG. 5 is another side view of the cartridge in the direction of arrow "B" in FIG. 3.

The plane transversing the passageway of flowing fluid 13 of the cartridge case 11 is, as shown in FIG. 3 and FIG. 5, a tapered plane 14 inclined toward the inside at the lower part. The edge of the gasket 21 fixed to the valve body 2 is shaped to mate with the above tapered plane, and thus, close contact of the tapered plane with the gasket gives perfect sealing of the fluid.

When the cartridge case 11 is placed in the space of the valve body 2, the passageway-side of the case is, due the action between the above tapered plane and the gasket, pushed toward the valve body 2 (to the left in the Figures). The gasket 22 lying between them maintains the seal and prevents ingress of the fluid into the clearance between the cartridge 11 and the valve body 2.

As may be readily seen from the above explanation, the parts indicated with the denser hatching in the Figures, namely, cartridge case 11, ball 3, valve seats 4A and 4B, and adjuster 5 in the case constitute the cartridge 10.

When the valve is to be inspected, bolts 61, 61 . . . are loosened to remove bonnet 6 and bonnet stem 7, then, the cartridge is ready to be taken out of the body. If repair is necessary because of erosion or corrosion, the cartridge is replaced with a new one, and the bonnet is re-set. The valve is thus ready for reuse. The old cartridge can be repaired later over an adequate period of time by being disassembled and, if necessary, a part or parts thereof renewed, and reassembled.

In order that the cartridge 10 may be easily attached to and detached from the valve body 2, it is recommended to provide the cartridge case 11 with a groove 17 on the inner surface of the upper part, and to use a device which matches the groove to hold the cartridge case.

Figure 6:
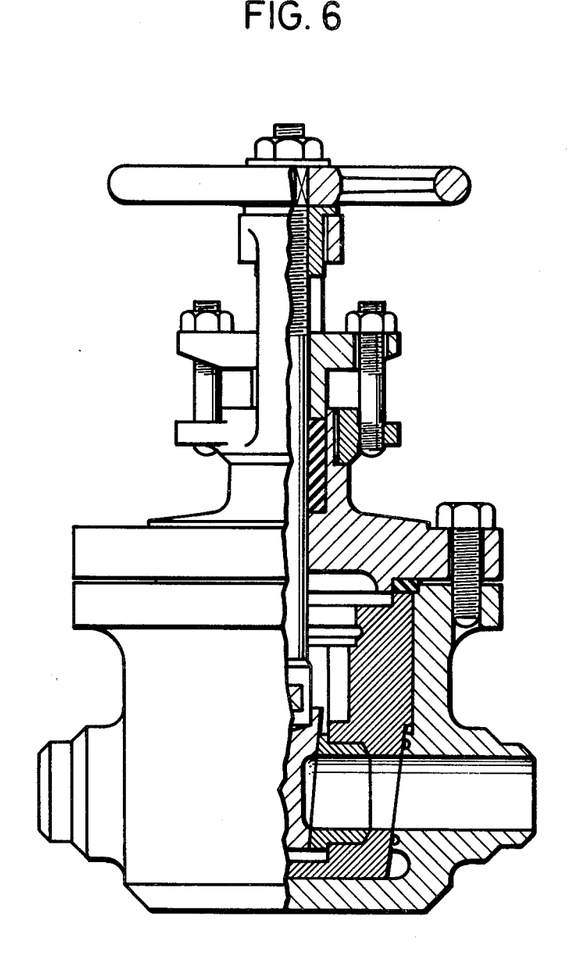
FIG. 6 shows another example of the basic embodiment of the present invention applied to a gate valve; half of the Figure being side elevation and the rest, vertical sectional view.
Figure 7:
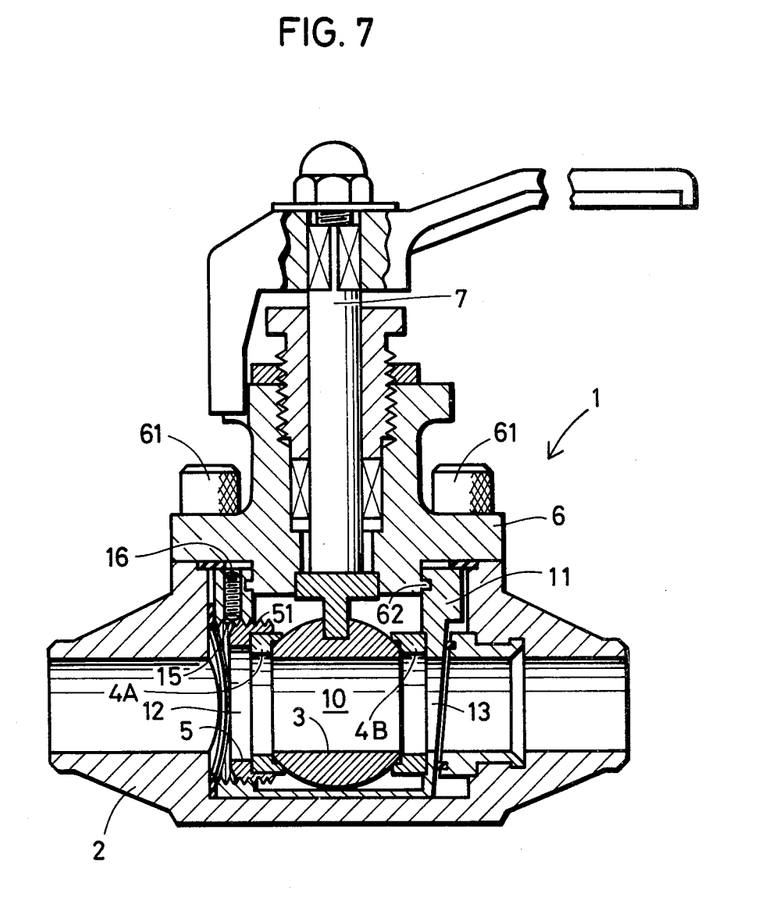
FIG. 7 is a sectional view, similar to FIG. 1, in the plane along the line of fluid flow and including the bonnet stem.
Figure 8:
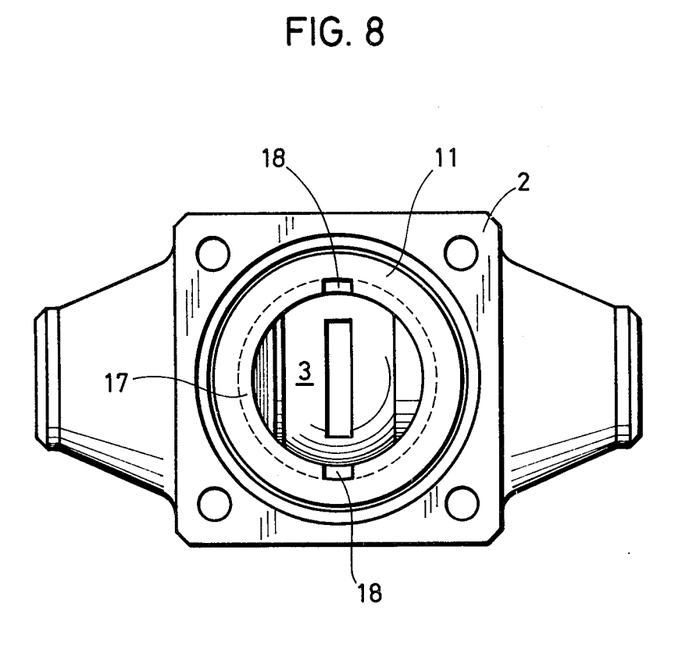
FIG. 8 is a plane view of the valve from which the bonnet is removed.
Figure 9:
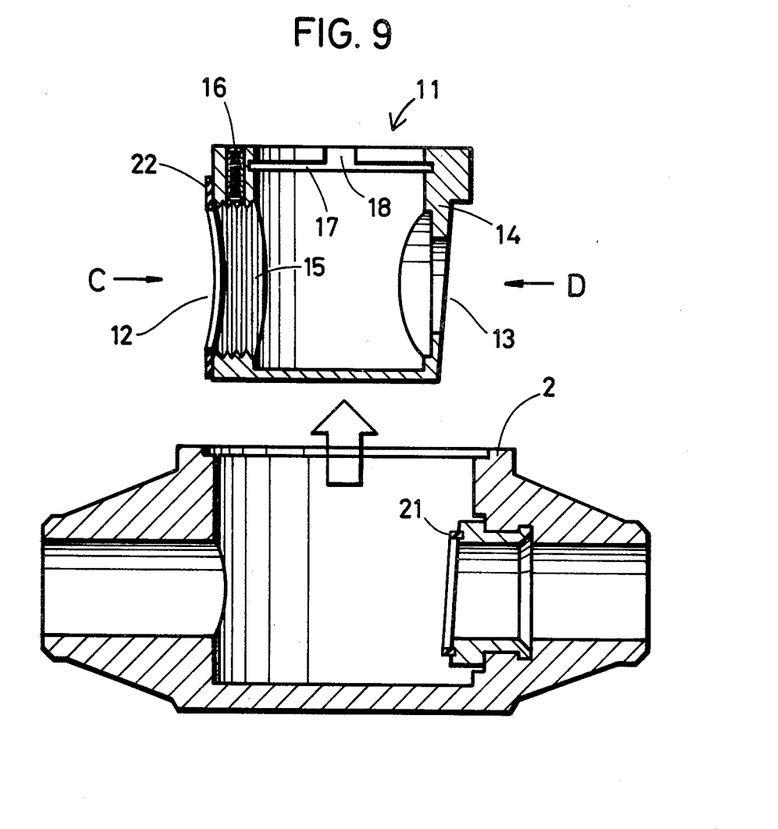
FIG. 9 shows, like FIG. 3, the valve body and the cartridge, the latter without inner parts, to show the cartridge case.
Figure 10:
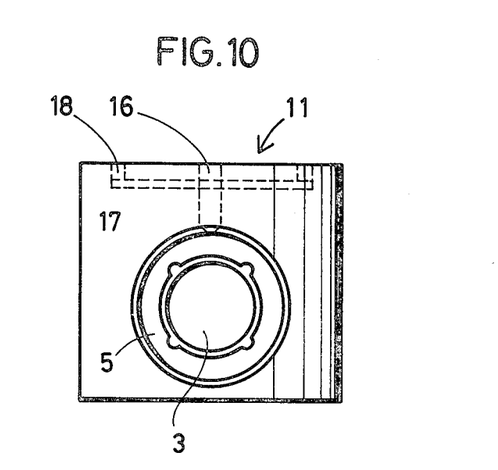
FIG. 10 is a side view of the cartridge in the direction of arrow "C" in FIG. 9.
Figure 11:
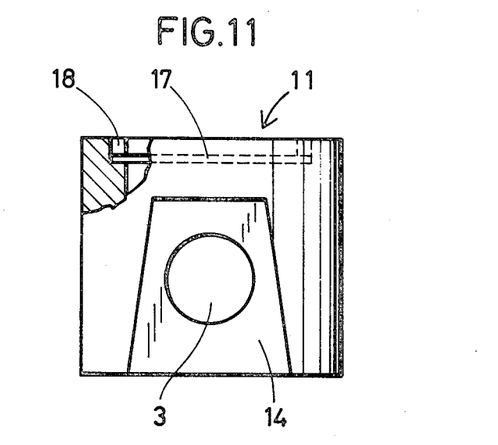
FIG. 11 is another side view of the cartridge in the direction of arrow "D" in FIG. 9.

The present invention is applicable not only to the above mentioned ball valve, but also valves of other types such as gate valve, check valve and globe valve. As an example, FIG. 6 shows a gate-valve to which the present cartridge method is applied. Also in FIG. 6, the parts indicated with the denser hatching constitute the cartridge.

The preferred embodiment of the present invention, in addition to the above described basic embodiment of the cartridge-type valve comprising a valve body, a valve head and a valve seat, and a bonnet and a bonnet stem, wherein the valve body is of box-type, the valve head and the valve seat are contained in a cartridge of a cylinder with closed bottom and having passageways for flowing fluid, characterized in that either of the lower part of the bonnet or the upper part of the cartridge has at least two radial projections, and that the other has a groove which engages with the projections and the groove is provided with passages of the projections so as to permit engagement and disengagement.

Again, a ball valve, a typical valve to which the present invention is applied, is explained below with reference to the attached drawings.

As shown in FIGS. 7 through 11, the preferred embodiment includes, in addition to the above described basic embodiment, means for engagement between the cartridge and the bonnet.

The improvement due to this embodiment resides, as noted aboe, in the fact that the cartridge 10 can be taken out at the same time as the removal of the bonnet. This is realized by providing two projections 62, 62 at the lower part of the bonnet, as well as groove 17 on the inner surface of the cartridge 11, which groove engages with the projections, and passages 18 which permit the projections to enter into the groove.

Figure 12:
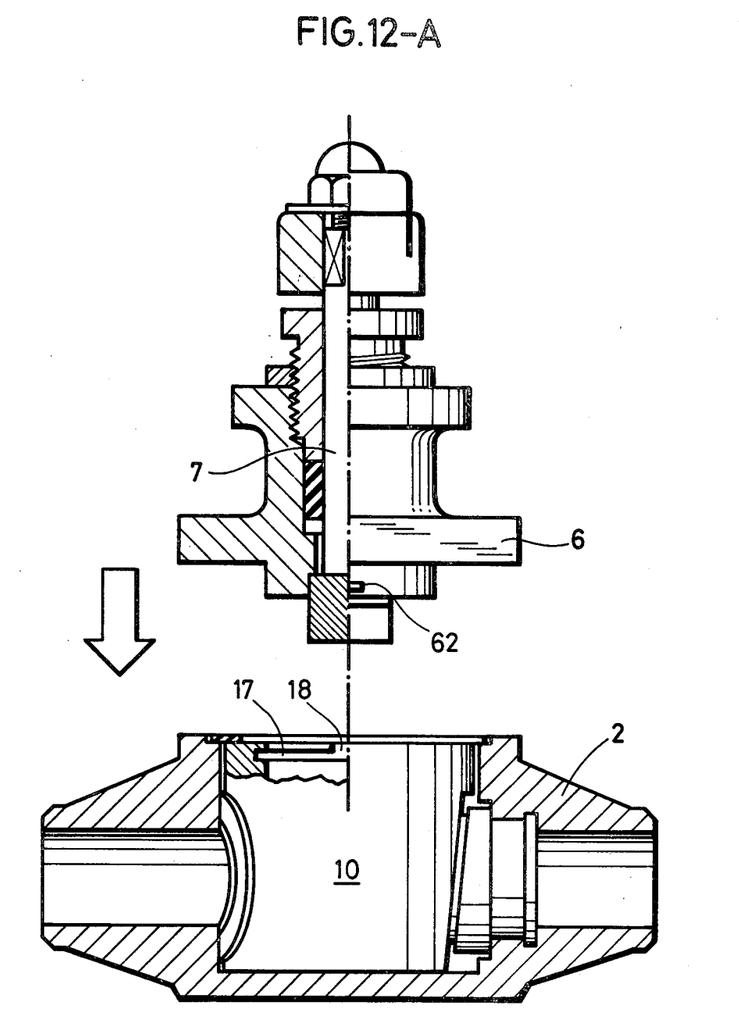
FIG. 12A shows the step at which the bonnet is to be set on the valve body in which the cartridge is placed.
FIG. 12B show the steps of attaching and detaching the cartridge which is engaged with the bonnet.

For the purpose of re-assembling the valve after inspection, repair or replacement of parts, subsequent to placing the cartridge 10 in the valve body 2, the bonnet 6 and the bonnet stem 7 are placed on the body. The bonnet should come down in such relative positions to the body, as shown in FIG. 12A, that the projections 62, 62 pass the passages 18, 18. The bonnet is turned 90° horizontally, and then the projections 62, 62 engage with the groove 17 so that the bonnet 6 and the cartridge 10 may be incorporated with a packing therebetween. By turning the bolts 61, to fasten the bonnet, assembly of the valve is completed.

When it is desired to detach the cartridge 10 for further inspection or repair, the fastening bolts 61, . . . are loosened, and the bonnet is lifted up. Then, the cartridge 10 which is incorporated with the bonnet is automatically taken out from the valve body 2, as shown in FIG. 12B. Thus, the two steps of removing the bonnet and detaching the cartridge can be carried out in one operation.

Needless to say, at the assembly of the valve, the cartridge 10 may be previously incorporated with the bonnet outside the valve body, and placed in the valve body through a procedure reverse to the above described with reference to FIG. 12B, to assemble the valve. This will be desirable if the work near a pipe line must be done within a short space of time. The present embodiment can be considered to enable not only the prompt detaching but also the prompt attaching of the cartridge.

The example shown in the Figures has the projections on the bonnet and the groove on the inner surface of the cartridge. Alternative arrangements may, of course, be practiced; i.e., a groove on the outer surface of the lower part of the bonnet and projections on the inner surface of the cartridge. The number of projections may, depending on the necessity, be increased to three, four or more. The angle of horizontal turn of the bonnet may be less than 90° so long as the engagement between the projection and groove is assured.

Like the basic embodiment, this preferred embodiment can be applied not only to ball valves but also to valves of other types such as gate valves, check valves and globe valves.

As noted above, a valve according to the present invention enables very quick inspection and repair by detaching the cartridge and, if necessary, replacing it with a spare cartridge. It is easy to visually inspect the parts in the cartridge detached from the valve body, and to find the cause of any trouble. The box-type valve body remains in place connected to the line pipe, and therefore, the inspection and repair of the valve can be conducted without exerting any influence on the pipe line system.

The present invention exhibits its greatest merits when applied to cases where liquid spillage or contamination of the human body or clothes must be avoided during servicing. This is because the amount of liquid remaining in the valve is much less than that of the conventional valves due to the difference in construction and, moreover, the remaining liquid is held in the cartridge case and can be easily poured to a vessel for disposal. Particularly, in the ball valves to which the present invention is applied, the liquid remaining in the valve can be kept in the passageway of the ball if the cartridge is detached in the valve "closed" state.

The handling of the valve can be conducted without direct contact with the liquid, if the valve construction is according to the preferred embodiment, or, even in the basic embodiment, if the device for holding the cartridge is used.

If the liquid in the line pipe remains in the box of the valve body and removal of the liquid is desired, it is recommended to provide the valve body with a draining nozzle at the bottom of the body.

Those skilled in the art could make other modification and addition to the above described invention.

The valve of the present invention is the most suitable when used in plants handling radioactive substances as first mentioned. It is also valuable for application in other fields of technology.

We claim:

1. A cartridge-type ball valve in a pipeline carrying a toxic fluid comprising a valve body, a cartridge containing a valve ball and two valve ball seats, and a bonnet and a bonnet stem; the cartridge together with the bonnet being attachable to and detachable from the valve body as a complete unit; wherein the valve body is a box, attached to the pipeline, having an inner shape conforming to the outer shape of the cartridge;

wherein the cartridge consists of a vertically cylindrical case having a closed bottom, passageways through opposite sides thereof for the flowing fluid, and opposing valve ball seats fitted adjacent said passageways, said ball being held by the valve seats; a plane traversing one of the passageways of the cartridge is a tapered plane inclined toward the inside at the lower part; one of the valve ball seats is fixed to the cartridge case and the other is carried by an adjuster which is threadingly received in one of the passageways;

and where radial projections are provided at the lower part of the bonnet in positions symmetrical about the bonnet center; a groove engaging with the projections surrounds the inner surface of the cartridge; and passages for the projections are provided in positions at which the bonnet 90° turned from positions of the projections in the assembled valve.

* * * * *